United States Patent
Wang et al.

(10) Patent No.: US 12,181,290 B2
(45) Date of Patent: Dec. 31, 2024

(54) CURVATURE VALUE DETECTION AND EVALUATION

(71) Applicant: HERE Global B.V., Eindhoven (NL)

(72) Inventors: Liming Wang, Chicago, IL (US); Qin Chen, Chicago, IL (US)

(73) Assignee: HERE Global B.V., Eindhoven (NL)

(*) Notice: Subject to any disclaimer, the term of this patent is extended or adjusted under 35 U.S.C. 154(b) by 380 days.

(21) Appl. No.: 17/576,367

(22) Filed: Jan. 14, 2022

(65) Prior Publication Data
US 2022/0228873 A1 Jul. 21, 2022

Related U.S. Application Data

(60) Provisional application No. 63/137,973, filed on Jan. 15, 2021.

(51) Int. Cl.
*G01C 21/26* (2006.01)
*G01B 11/24* (2006.01)
*G01C 21/00* (2006.01)
*G01C 21/32* (2006.01)

(52) U.S. Cl.
CPC .............. *G01C 21/32* (2013.01); *G01B 11/24* (2013.01); *G01C 21/265* (2013.01); *G01C 21/3819* (2020.08); *G01C 21/3841* (2020.08)

(58) Field of Classification Search
CPC .. G01C 21/32; G01C 21/265; G01C 21/3819; G01C 21/3841; G01B 11/24
See application file for complete search history.

(56) References Cited

U.S. PATENT DOCUMENTS

| | | | |
|---|---|---|---|
| 2016/0245657 A1* | 8/2016 | Dorum | G01C 21/3881 |
| 2016/0247029 A1* | 8/2016 | Dorum | G01C 21/3811 |
| 2020/0400439 A1* | 12/2020 | Thompson | G01C 21/3697 |
| 2023/0256992 A1* | 8/2023 | Terazawa | G16Y 40/20 |
| | | | 701/23 |

* cited by examiner

*Primary Examiner* — Manuel A Rivera Vargas
(74) *Attorney, Agent, or Firm* — Lempia Summerfield Katz LLC

(57) ABSTRACT

Systems and methods for the detection and analysis of curvature data are described. A method includes: receiving position data of a vehicle turning maneuver along a portion of a roadway, where the position data includes measured position data collected by sensors of a vehicle while traversing the vehicle turning maneuver; associating the received position data with map data of the portion of the roadway; generating a spline based on the position data, the spline being a smooth curve representing the vehicle turning maneuver from a first road segment to a second road segment; identifying a segment of the spline containing a turning point of the vehicle turning maneuver, the turning point representing a change of a vehicle path from along the first road segment to along the second road segment; and determining a maximum curvature value for the identified segment of the spline.

20 Claims, 10 Drawing Sheets

CURVATURE VALUE DETECTION AND EVALUATION

CROSS-REFERENCE TO RELATED PATENT APPLICATION

This application claims the benefit of the filing date under 35 U.S.C. § 119(e) of Provisional U.S. Patent Application Ser. No. 63/137,973, filed on Jan. 15, 2021, which is hereby incorporated by reference in its entirety.

FIELD

The following disclosure relates to the detection and evaluation of curvature values using automated large-scale data analysis to provide highly accurate ground truth curvature data.

BACKGROUND

Maps are a simplified extraction of the real world and have many uses, including navigation. Computer based maps of geographic areas include data representative of navigable paths (e.g., roads, streets, walkways), intersections, curvature data, points of interest and other features. The navigable paths may be represented by discrete data points. A discrete data point may be a coordinate pair (latitude and longitude) or triple (latitude, longitude, and altitude). However, the discrete data points provide only an estimate of the navigable path. The exact location of the navigable path between discrete data points (i.e., ground truth) may not be available. Instead, the navigable paths are approximated to form a path curve. The path curve may deviate from the actual navigable path. Since curvature values of these navigable paths are determined based on the discrete data points that make up the navigable paths, the curvature values based thereon are only as accurate as the data points. Therefore, the exact, or ground truth, curvature values may also not be available.

Further, the collection of path curves and curvature data in a database may vary because the path curves and corresponding curvature values are generated from different sources and generated using different techniques. Some path curves may be derived from historical maps and surveys. Some path curves may be traced from aerial or satellite photographs using GPS data (i.e., GPS traces). Some path curves may be manually generated by a person using a computer. Different cartographers may select different end points, nodes, and shape points for generating a path curve by computer. This leads to various possible sources of curvature data. For instance, a "3-point" method has been proposed where three points are manually selected on a center line of a path curve or maneuver trace and the radius of a circle passing through those three points is deemed to be the ground truth curvature radius. However, this method has several drawbacks. The selection of the three points is rather ad-hoc and heavily relies on the availability of accurate satellite image, center line marking, as well as an involved human decision on the point location. Manual measurements, such as measuring a curviest point of a curve by checking satellite images, lead to issues with accuracy, scalability, and uniqueness. Manual methods also hinder the ability to have a fully automatic process and accurate understanding of overall system performance. Furthermore, manually set, flat detection error tolerance values are too idealistic and stringent, which generally tends to underestimate the true overall detection performance.

Some driving assistance systems utilize curvature values to provide improvements in the comfort, efficiency, safety, and overall satisfaction and performance of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle using curvature values. Other advance driver assistance systems may retrieve curvature values from pre-stored map data in order to determine the current state of the vehicle and the current state of the roadway in front of the vehicle.

Variations in sources of ground truth data and path curve generation lead to inconsistent accuracies in the database for both navigable path curves and curvature data and may lead to negative implications on driver assistance systems. There is a need for more accurate ground truth curvature data that will help improve vehicle performance and provide an even safer drive.

SUMMARY

In one embodiment, a method includes receiving, by a processor, position data of a vehicle turning maneuver along a portion of a roadway, where the position data includes measured position data collected by sensors of a vehicle while traversing the vehicle turning maneuver, associating, by the processor, the received position data with map data of the portion of the roadway, generating, by the processor, a spline based on the position data, the spline being a smooth curve representing the vehicle turning maneuver from a first road segment to a second road segment, identifying a segment of the spline containing a turning point of the vehicle turning maneuver, the turning point representing a change of a vehicle path from along the first road segment to along the second road segment, and determining a maximum curvature value for the identified segment of the spline.

In one embodiment, an apparatus includes a memory, a map matching module, a splining module, and a curvature module. The memory includes a plurality of sets of vehicle trace data, where each set of vehicle trace data is separately collected by one or more vehicles while traversing a turning maneuver from a first road segment to a second road segment along a portion of a roadway. The map matching module is configured to associate the plurality of sets of vehicle trace data with map data of the portion of the roadway. The splining module is configured to generate respective splines for respective sets of vehicle trace data using a cubic spline fitting technique and identify respective segments of the respective splines containing a curve with a smallest radius of curvature. The curvature module is configured to determine respective maximum curvature values for the identified respective segments of the respective splines and calculate an average curvature value of the respective maximum curvature values.

In one embodiment, a non-transitory computer readable medium includes instructions that when executed are configured to perform receiving position data collected by sensors of a vehicle while traversing a turning maneuver from a first road segment to a second road segment along a portion of a roadway, associating the received position data with map data of the portion of the roadway, generating a spline based on the position data, the spline being a smooth curve representing the turning maneuver, identifying a segment of the spline containing a curve with a smallest radius of curvature, determining a maximum curvature value for the identified segment of the spline, and selecting an assisted or automated driving function based on the maximum curvature value.

BRIEF DESCRIPTIONS OF THE DRAWINGS

Exemplary embodiments of the present disclosure are described herein with reference to the following drawings.

DETAILED DESCRIPTION

Figure 1:
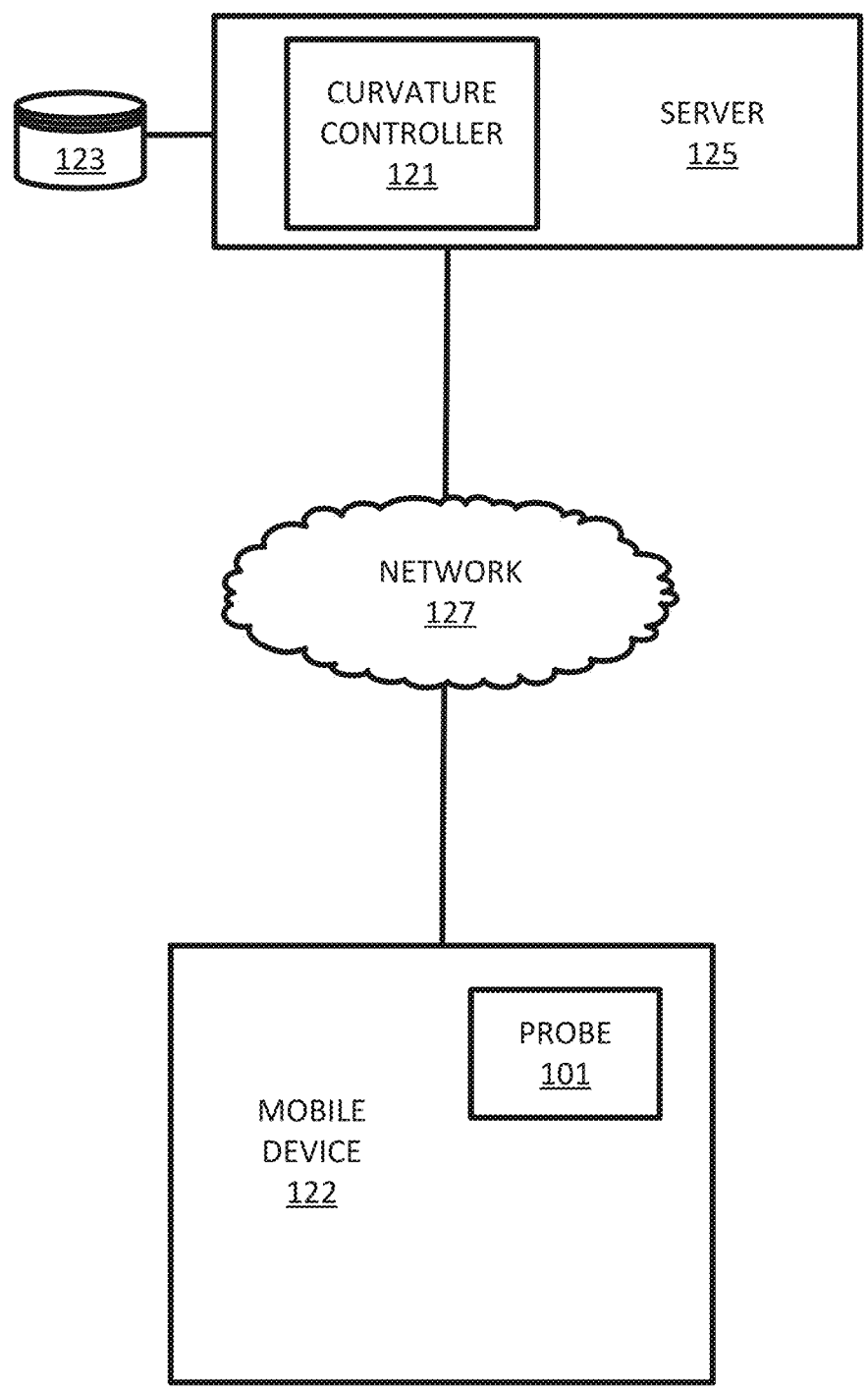
FIG. 1 illustrates an example system for curvature value determination.

Curvature data, as defined herein, includes data that is associated with a curve of a road or path, such as radius values. Curvature indicates the degree to which a curve deviates from a straight line (or the degree to which a curved surface deviates from a plane) and may be expressed as a numerical quantity, such as a curvature value, which is equal to the reciprocal of the radius of the curve. Thus, the smaller the radius, the higher the curvature value, which indicates a sharp turn. Likewise, the larger the radius, the smaller the curvature value, which indicates a more subtle turn.

Curvature data, such as the radius of a curve and curvature values, may be determined in a variety of techniques. Curvature values may be mathematically calculated given known or detected measurements of a curve. Curve radii may also be manually measured. In one example, curvature values are detected or determined based on probe data available for the curve of interest. Probe data may consist of geographic location such as a longitude value and a latitude value and may include a height or altitude, as will be discussed in greater detail below. However, if the underlying probe data is not accurate, the resulting curvature data obtained from the probe data will also be of poor quality. The proposed solution deals with this problem by leveraging very high-quality probe data to provide a new metric for determining curvature values using automated large-scale data analysis. The new metric aims to establish a new set of ground truth data and error margin thereof based on real driving trajectories, as opposed to approximations based on image and positional data.

Existing techniques for determining curvature values rely on manual processes, such as manually annotating satellite images. However, as stated above, manual methods have a higher risk of error and lead to poor Key Performance Indicators (KPIs) that are not reliable. For instance, in order to determine a vehicle trajectory of a maneuver of interest, many existing techniques rely on a centerline of a lane to figure out where a vehicle should be on a roadway prior to, during, and after a particular maneuver. The technical problem of these manual processes is that they use satellite images and may be at a disadvantage, particularly if lane markings and boundaries are indiscernible or of poor quality. As such, the manual process may involve some guess work as to where a vehicle trajectory may go. Even with high-definition (HD) maps or satellite images, there still may be a range of options for a particular vehicle maneuver, since individual lanes are not marked with a centerline and the quality of HD maps may vary. Further, there may be limited coverage for lane-level HD maps. Here again, manually selecting a centerline of where a vehicle should be involves some guesswork, which leads to an increased risk of inaccuracies. In addition to manual sketches or reproductions of predicted vehicle maneuvers being quite different from actual vehicle maneuvers, the manual sketches or reproductions may vary between the person performing the predictions.

To resolve this technical problem, the proposed solution uses very high-quality data based on real driving trajectories (i.e., real vehicle trace data). The high-quality data is collected by vehicles actually performing a particular maneuver. One advantage of this technique is that it takes the guesswork out of figuring out what a vehicle trajectory might look like, since the data represents actual trajectories taken by vehicles traversing the particular maneuver and faithfully reflects the change of road geometry and the actual driving behavior. Another advantage is that the data is significantly more accurate than previously provided probe data, since the collection vehicles are using newer, updated and higher quality technologies and processes to collect the data.

Another problem with existing methods is how relative error is determined. Oftentimes, it is a manually selected parameter, such as a flat 5% or 10% error margin. However, this value is not based on the underlying data. With the proposed solution, the relative error is data driven and based on evidence, which helps define a more reliable KPI. For instance, if all the data collected from actual, real vehicles traversing a particular maneuver shows a relative error margin of 20%, then that is the margin one should use and rely on, as opposed to a manually selected arbitrary value.

Another improvement made available by the proposed solution is how it may be easily scaled to accommodate growing data sets. Existing solutions are not easily scalable, since the availability of manual resources is limited and may not be able to handle the growing demand of these types of services. The proposed process, however, is workable for large sets of data and can be a fully automated process with no manual component.

The following embodiments provide improvements for establishing a more appropriate evaluation metric under automated large-scale data analysis and for extracting more accurate ground truth curvature data. As such, reliance on satellite images and manual selection processes may be dispensed with, since the following embodiments are based on real driving trajectory data for a given maneuver, where the data is collected by vehicles during traversal of the given maneuver.

The following embodiments reduce the amount of resources required to determine curvature values. As noted above, manual processes for projecting vehicle paths take time, require various types of data, such as satellite image data, map data, and location data, and require different systems to function, such as a human draftsperson and various computing resources to merge the various data types and outputs of these systems together. The following embodiments are automatic, utilize just map data and positional data, and are implemented on a single system. The disclosed embodiments may also lead to an improvement in the computational system, e.g. in the way that curvature data is determined and validated using the disclosed methods. The increased efficiency and usage of resources may lead to less downtime, quicker implementation time, fewer errors, and as such, more efficient use of navigation services. The quicker implementation time and fewer errors may lead to more accurate up to date map data for navigation services.

Curvature data may be of particular importance to content providers, such as map developers and application developers, to include the curvature data in detailed maps of locations or applications reliant on location related information. This curvature data may also be used by end users, navigational services, or traffic server providers. For example, curvature data may be used for autonomous driving or assisted driving. A curvature value may dictate speed, for example, for a property (e.g., curvature) of an upcoming roadway. For example, a large curvature value, which corresponds to a small radius, indicates a sharp curve. In this case, the curvature value may dictate a lower speed in order to safely traverse the curve. Dictating speeds based on curvature values may also increase the efficiency and performance of a vehicle, since not only does slowing a vehicle down increase safety, but it may also reduce fuel consumption up to 5% and thus increase fuel performance. In this way, curvature values may also dictate engine control operations, such as gear shifting, which leads to engine load management optimization. In one example, curve data may be used to perform energy efficient coast maneuvers. Curvature data may also be used for intelligent activation of other vehicle controls, such as torque, as well as improved interaction with proximity control assistance features. Curvature data may also be used for highly assisted driving on interurban roads as well as automatic set speed adjustments.

Curvature data may indicate where to turn and the presence of intersections. For example, curvature values associated with 90-degree turns may indicate a turn, particularly at an intersection. Curvature data may also indicate the presence of hazardous conditions or accident-prone locations. For example, high curvature values associated with sharp curves may be indicative of locations more likely to cause accidents.

The following embodiments also relate to several technological fields including but not limited to navigation, autonomous driving, assisted driving, traffic applications, and other location-based systems. The following embodiments achieve advantages in each of these technologies because improved data for driving or navigation improves the accuracy of each of these technologies. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in accuracy and speed.

FIG. 1 illustrates an example system for curvature data analysis and application including a mobile device 122, a server 125, a geographic database 123, and a network 127. Additional, different, or fewer components may be included in the system. The following embodiments may be entirely or substantially performed at the server 125, or the following embodiments may be entirely or substantially performed at the mobile device 122. In some examples, some aspects are performed at the mobile device 122 and other aspects are performed at the server 125. In FIG. 1, the server 125 may include a controller 121, such as a curvature controller 121 discussed in more detail below with respect to FIG. 2. The server 125 may be connected to the geographic database 123 and the mobile device 122 through the network 127.

The mobile device 122 may include a probe 101 or position circuitry such as one or more processors or circuits for generating probe data. The probe points are based on sequences of sensor measurements of the probe devices collected in a geographic region. The probe data may be generated by receiving Global Positioning System (GPS) or other global navigation satellite system (GNSS) signals and comparing the GPS or GNSS signals to a clock to determine the absolute or relative position of the mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as the probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user.

Communication between the mobile device 122 and the server 125 through the network 127 may use a variety of types of wireless networks. Some of the wireless networks may include radio frequency communication. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handyphone system (PHS), and 4G or long term evolution (LTE) standards, 5G, DSRC (dedicated short range communication), or another protocol.

Figure 2:
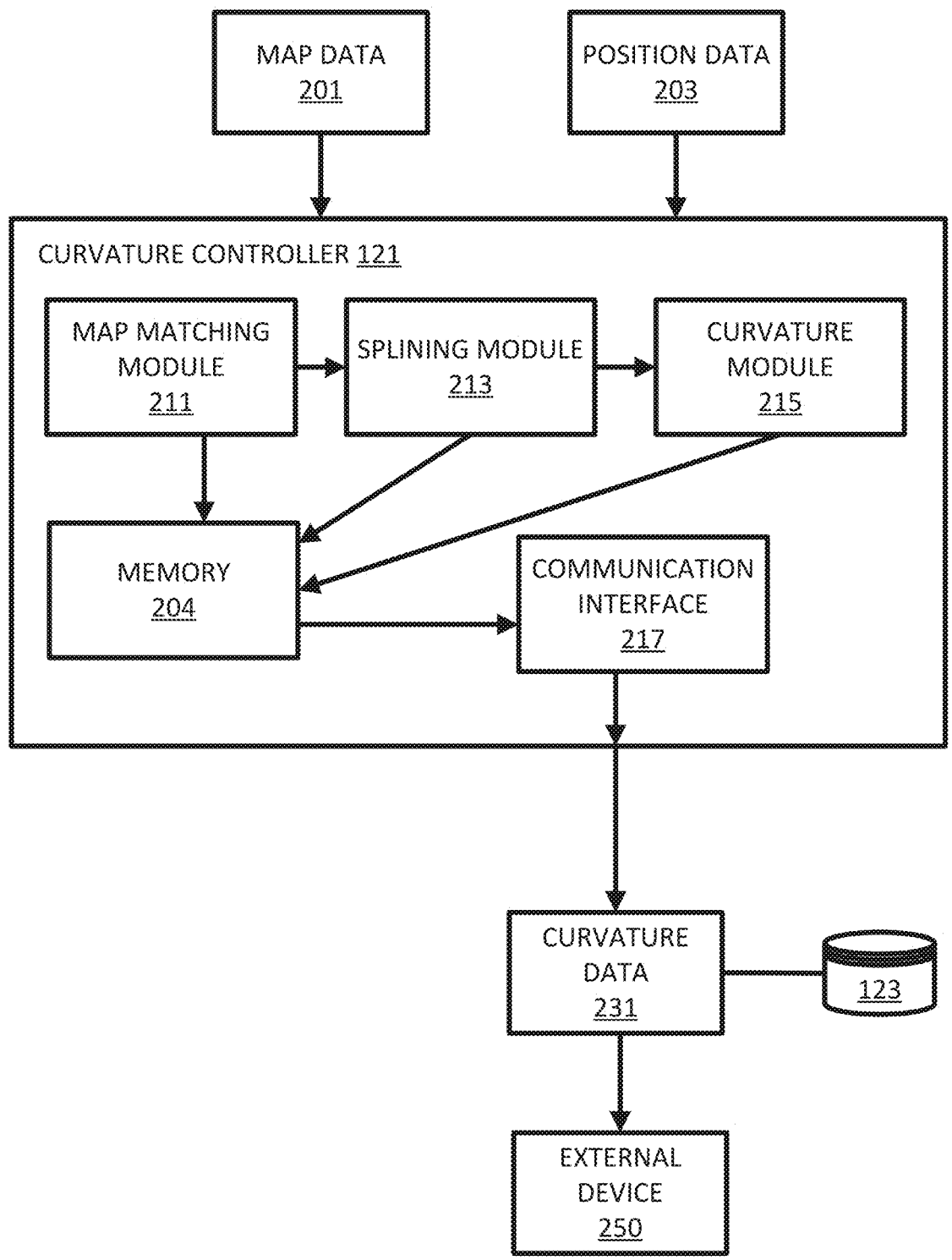
FIG. 2 illustrates an embodiment of a curvature controller for the system of FIG. 1.

FIG. 2 illustrates an embodiment of a curvature controller 121 for the system of FIG. 1. While FIG. 1 illustrates the curvature controller 121 at server 125, the mobile device 122 may also implement the curvature controller 121. Additional, different, or fewer components may be included.

The curvature controller 121 may include a map matching module 211, a splining module 213, and a curvature module 215. The curvature controller 121 may also include a memory 204. Other computer architecture arrangements for the curvature controller 121 may be used. The curvature controller 121 receives data from one or more sources. The data sources may include map data 201 and position data 203, but additional data sources are possible. The map data 201 may include road network data, such as road segment data and node data, and is discussed in more detail below. The map data 201 may be aggregated from multiple mobile devices. The map data 201 may be aggregated across a particular service, platform, and application. For example, multiple mobile devices may be in communication with a platform server associated with a particular entity. For example, a vehicle manufacturer may collect map data from various vehicles and aggregate the map data. In another example, a map provider may collect map data 201 using an application (e.g., navigation application, mapping application running) running on the mobile device 122.

The position data 203 may include position information and may be determined by the mobile device 122 and stored by the mobile device 122. The position data 203 may include geographic coordinates, such as latitude and longitude pairs. Position data 203 may be collected, stored, and communicated in discrete sets, where each set includes any number of latitude/longitude coordinate pairs that represent a particular path, trajectory, or maneuver of the mobile device 122 or a vehicle containing the mobile device 122. Position data 203 may also be referred to as GPS data, GPS trace data, or vehicle trace data.

In one example, the curvature controller 121 receives position data 203 of a vehicle turning maneuver along a portion of a roadway. As mentioned above, the position data 203 may include measured position data collected by sensors of a vehicle, such as vehicle 124 described below with respect to FIG. 9, or collection vehicles, such as the HERE's True HD Mapping Vehicle or Google's Street View car. Position data 203 may also be collected by original equipment manufacturer (OEM) sensors on all other types of vehicles, as long as the OEM sensors are capable of capturing high quality data. In this example, the measured position data is collected by the sensors of the vehicle while the vehicle traverses the vehicle turning maneuver. In this regard, the position data 203 may be referred to as vehicle trace data.

The position data 203, or vehicle trace data, may be received by the curvature controller 121 as sets of position data 203, where each set of position data 203 is separately collected by one or more vehicles while traversing a turning maneuver from a first road segment to a second road segment along a portion of a roadway. For example, one vehicle may collect a first set of position data 203 while performing a maneuver and another vehicle may collect a second set of position data 203 while performing that same maneuver. The more vehicles that collect position data 203 while performing that maneuver results in more sets of position data 203 associated with that particular maneuver. In this regard, each set of position data 203 corresponds to a vehicle trace of a vehicle performing a particular maneuver. The memory 204 of the curvature controller 121 may store the plurality of sets of position data 203.

Having position data 203 based on real driving trajectories results in more accurate ground truth data, which improves functions, services, and calculations that are based on the ground truth data. Establishing more accurate and high-quality ground truth data also allows for the avoidance of the aforementioned drawbacks to manual methods of establishing ground truth data, as discussed below in FIGS. 3A and 3B.

Figure 3A:
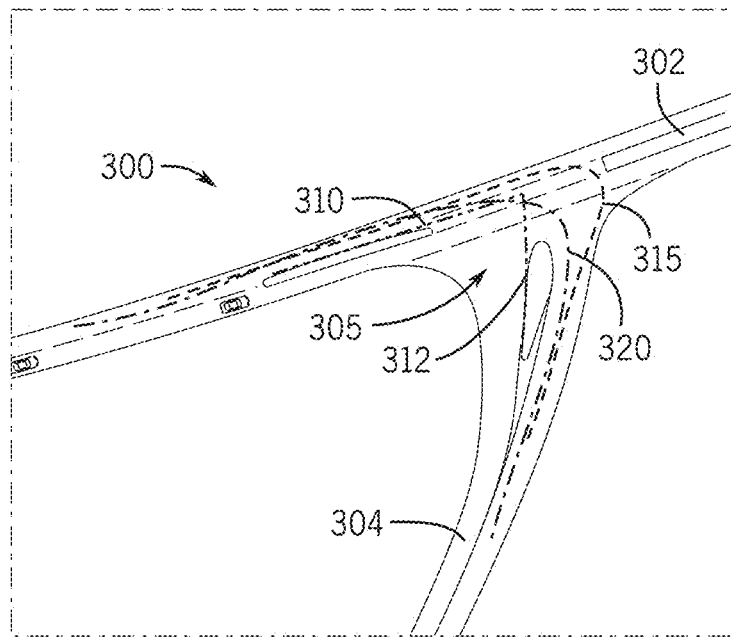
FIG. 3A illustrates possible path curves for one intersection maneuver.
Figure 3B:
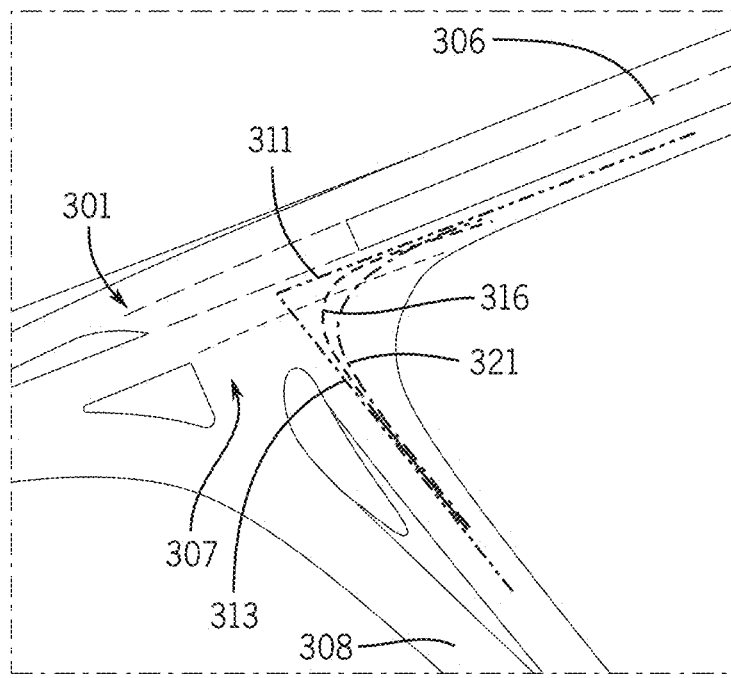
FIG. 3B illustrates possible path curves for another intersection maneuver.

FIGS. 3A and 3B illustrate possible path curves for two different intersection maneuvers at an intersection of two road segments at a region of the roadway. FIG. 3A shows a region of a roadway 300 having two road segments 302, 304 that form an intersection 305. Basic map data may only contain road segment data that represents the center of each road segment, such as road segment data 310 for road segment 302 and road segment data 312 for road segment 304. Based on this basic map data, manual methods of determining vehicle path curves, such as curves 315 and 320, use the road segment data 310, 312 along with satellite imagery for the intersection 305 at the region of the roadway 300 to predict how a vehicle may perform a maneuver at that intersection 305, such as a left hand turn as shown in FIG. 3A. In this case, a person may draw a centerline of the turning maneuver to represent how a vehicle may traverse the left hand turn from road segment 304 to road segment 302. However, as shown in FIG. 3A, a left-hand turning maneuver is not necessarily unique and may vary depending on a number of factors, such as the person driving, the vehicle being driven, the road conditions, etc., which makes it difficult to obtain ground truth data. For example, a first path curve 315 may represent a turning maneuver of a large vehicle that requires a wider turn, such as semi-trailer truck, whereas a second path curve 320 may represent a turning maneuver of a smaller sized passenger car. Even the same driver that drives the same car through the same maneuver repeatedly may result in varying path traces or trajectories. Given the wide variance of possible maneuver trajectories, determining accurate ground truth data for these types of maneuvers becomes increasingly important, since an optimal curve may not be clear or well-defined for many intersection maneuvers. However, the problem with manual methods is that they rely on the quality of the underlying map data and satellite imagery data to predict the possible path curves. As shown in FIG. 3A, centerlines of individual vehicle lanes are not depicted. Therefore, a person sketching a vehicle trajectory will have to guess as to where the center of the lane actually is. This leads to vehicle path curves that may not accurately reflect how a vehicle actually traverses the maneuver.

FIG. 3B shows another example of a region of a roadway 301 having two road segments 306, 308 that form an intersection 307. Similar to FIG. 3A above, basic map data may only contain road segment data that represents the center of each road segment, such as road segment data 311 for road segment 306 and road segment data 313 for road segment 308. FIG. 3B illustrates that even when a lane centerline may be more easily discernible from the context of the satellite image, such as with certain HD maps, two different vehicle path curve interpolations may still result, such as an outer path curve 316 and an inner path curve 321.

Referring back to FIG. 2, in one example, the curvature controller 121 may associate the received position data 203 with map data 201 of the portion of the roadway. In one example, the curvature controller 121 may map match the position data 203 with road segment data. After one or more map matching procedures, a road segment may be identified that corresponds to the position data 203 and may also correspond to the current position of the mobile device 122. Additional map matching techniques may connect the trace for a vehicle (e.g., position data 203) to the specific location of lane markings rather that the center of a road, which may be done in other map matchers. Using this type of map matching, the curvature controller 121 may also determine the direction of travel for a maneuver on a bidirectional link based on map matching with the lane marking.

In another example, the map matching module 211 of the curvature controller 121 is configured to associate the position data 203 with the map data 201. In this example, when a plurality of sets of vehicle position data 203, or trace data, is received and stored by the memory 204 of the curvature controller 121, the map matching module 211 is configured to associate the plurality of sets of vehicle trace data with the map data 201 of the portion of the roadway.

Figure 4A:
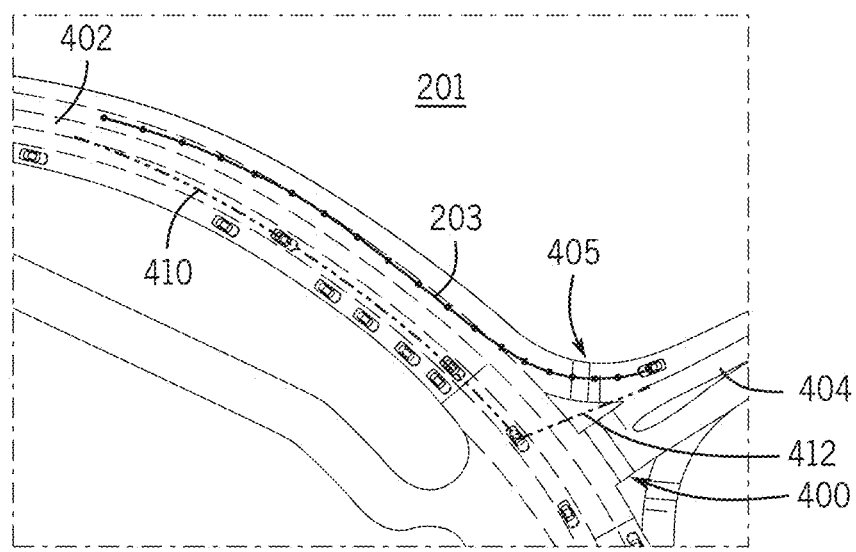
FIG. 4A illustrates an example set of position data having been map-matched.

FIG. 4A illustrates an example set of position data having been map-matched. As shown in FIG. 4A, the position data 203 is associated, or map matched, with the map data 201 for the portion of the roadway 400. Any number of map matching techniques may be used to associate the position data 203 with map data 201. In one example, the associating is performed by a path-based map matcher. The map data 201 may include road segment data that represents the center of each road segment, such as road segment data 410 for road segment 402 and road segment data 412 for road segment 404. In the example shown in FIG. 4A, the position data 203 is collected from a vehicle while traversing a vehicle turning maneuver 405 (e.g., right hand turn) from one road segment 404 onto another road segment 402.

Referring back to FIG. 2, in one example, the curvature controller 121 generates a spline based on the position data 203. The spline may be a curved geometry (e.g., polynomials or path curves) representing a vehicle turning maneuver from a first road segment to a second road segment by smoothly interpolating acquired positional points. A spline may be generated from two-dimensional link geometry. For example, the position data 203 may include a series of point data containing positional coordinates (e.g., latitude and longitude). The series of points may be connected by line segments to form the link geometry. The links may be used to fit a smooth path curve by estimating the link geometry as polynomials, spline curves, b-spline curves, bezier curves, clothoids, or other parametric or non-parametric curve types. The path curve may be two-dimensional (e.g., latitude and longitude), three-dimensional (e.g., latitude, longitude, and height) or have another number of dimensions. In one example, the spline is generated using a cubic spline fitting technique to generate a smooth curve. In another example, polynomial interpolation or approximation techniques, such as a non-uniform rational B-spline (NURBS) interpolation or approximation may be used to generate the path curve from the road geometry. Calculus of Variations may also be used to impose shape constraints of the curve shape in between the constraints. Any smooth curve fitting or any data analysis technique for estimating parameters in a spline polynomial, now known or later developed, may also be used. The resulting smooth curve, or spline, is treated as the ground truth trajectory for the maneuver.

In another example, the splining module 213 of the curvature controller 121 is configured to generate a spline based on the position data 203. In this example, when a plurality of sets of vehicle position data 203, or trace data, is received and stored by the memory 204 of the curvature controller 121, the splining module 213 is configured to generate respective splines for respective sets of vehicle trace data. In one example, the splining module 213 is configured to use a cubic spline fitting technique.

Figure 4B:
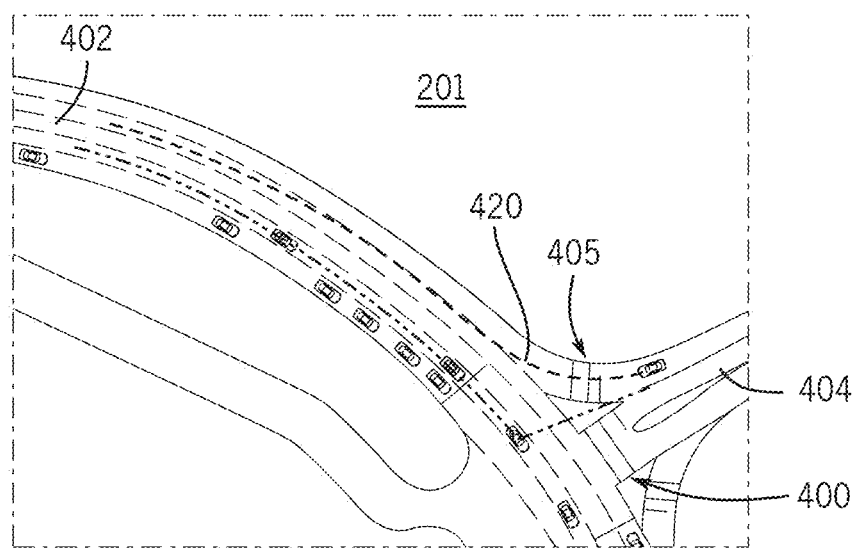
FIG. 4B illustrates the map-matched position data of FIG. 4A being spline fitted.

FIG. 4B illustrates the map-matched position data 203 of FIG. 4A being spline fitted. As shown in FIG. 4B, the spline 420 is a smooth curve that represents a trajectory of a vehicle while traversing a vehicle turning maneuver 405 (e.g., right hand turn) from one road segment 404 onto another road segment 402.

Referring back to FIG. 2, in one example, the curvature controller 121 identifies a segment of the spline containing a turning point of the vehicle turning maneuver. The turning point represents a change of a vehicle path from along the first road segment to along the second road segment. The turning point may be associated with the curviest point, or the sharpest curve, of the spline. In this regard, the curviest point of the spline may be the point of the spline at which the radius of the curve is the smallest. In one example, as will be discussed in detail below with respect to FIG. 4C, identifying the segment of the spline may include the curvature controller 121 first identifying a common node or point of intersection between the first road segment and the second road segment in the map data that make up the intersection. The curvature controller 121 may then determine a projection point on the spline nearest the common node or point of intersection. Next, the curvature controller 121 may identify or designate a predetermined range of the spline centered at the projection point as the segment of the spline. Other methods may also be used to find the curviest point, or curviest segment, of the vehicle turning maneuver.

In another example, the splining module 213 of the curvature controller 121 is configured to identify a segment of the spline containing the turning point of the vehicle turning maneuver. In this example, when a plurality of sets of vehicle position data 203, or trace data, is received and stored by the memory 204 of the curvature controller 121, the splining module 213 is configured to identify respective segments of the respective splines containing a curve with a smallest radius of curvature. In this example, the splining module 213 is configured to identify a common node or point of intersection between the first road segment and the second road segment in the map data, determine a projection point on the respective splines nearest the common node or point of intersection, and identify a predetermined range of the respective splines centered at the projection point as the respective segments of the respective splines.

Figure 4C:
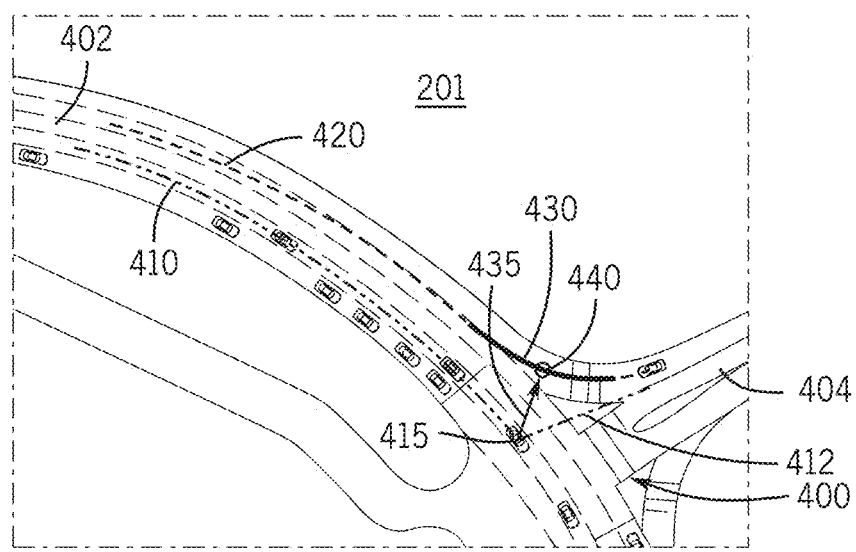
FIG. 4C illustrates an identified segment and projection point of the spline of FIG. 4B.

FIG. 4C illustrates an identified segment 430 and projection point 440 of the spline 420 of FIG. 4B. As mentioned above, to identify the segment 430 of the spline 420, the curvature controller 121 first identifies a common node 415 or point of intersection 415 between the first road segment 402 and the second road segment 404 in the map data 201 that make up the intersection. The curvature controller 121 may use road segment data that represents the center of each road segment, such as road segment data 410 for road segment 402 and road segment data 412 for road segment 404, to identify the common node 415 or point of intersection 415. The curvature controller 121 may then determine a projection point 440 on the spline 420 nearest the common node 415 or point of intersection 415. In one example, the common node is snapped to the spline 420 trajectory by projecting the common node 415 to the nearest point on the spline 420 trajectory. This is shown by the arrow 435 in FIG. 4C. Next, the curvature controller 121 may identify or designate a predetermined range of the spline 420 centered at the projection point 440 as the segment 430 of the spline 420. In one example, the predetermined range may be determined so as to cover the curviest portion of the spline 420. In one example, a predetermined range of 10 meters may be used. In another example, 20 meters may be used. Other ranges are possible.

Referring back to FIG. 2, in one example, the curvature controller 121 determines a maximum curvature value for the identified segment of the spline. The curvature controller 121 may determine curvature values for every point along the segment and then search for the largest value over the designated range of the segment. As mentioned above, a curvature value is a numerical value equal to the inverse of the curvature radius at that point. In this regard, the curvature controller 121 may determine radii values for every point along the segment and then calculate curvature values for those points by calculating the inverse of those radii. The curvature controller 121 may then search for the largest curvature value in that range. In another example, the curvature controller 121 may determine radii values for every point along the segment, identify the smallest radius along the segment, and calculate the curvature value for that single point having the smallest radius, since the point on the curve within the identified segment having the smallest radius will also have the highest curvature value.

In this way, the entire maneuver represented by the position data 203 and spline trajectory may be distilled down to a single curvature value, which is the maximum curvature value for a given segment of the spline. This is another technical advantage of the proposed solution described herein, since the proposed embodiments reduce the amount of computing and networking resources required to communicate curvature data. Position data 203 and spline representations may contain large amounts of data and require a large amount of storage space and bandwidth in order to be processed and communicated in a mobile system. The disclosed embodiments utilize a single curvature value to represent specific vehicle maneuvers, which greatly reduces the storage and/or bandwidth requirements while massively reducing the data size as compared to maneuvers modeled based on position data 203, map data 201, and satellite imagery.

As discussed above, various sets of position data 203 that correspond to a particular vehicle maneuver may be collected by one or more vehicles. In one example, the curvature controller 121 may repeat the receiving, associating, generating, identifying, and determining steps described above for a plurality of sets of position data 203 corresponding to the vehicle turning maneuver. In this example, each set of position data 203 of the plurality of sets of position data 203 is separately collected by a vehicle while traversing the vehicle turning maneuver. While each set of position data 203 may be associated with a single collection source (e.g., vehicle), the collection source may not be the same for all sets of position data 203. In this example, the curvature controller 121 may calculate an average curvature value of respective maximum curvature values for the plurality of sets of position data 203. In this case, the average curvature value represents a ground truth curvature value over all available trajectories for a given maneuver. Averaging curvature values across numerous sets of position data 203 is another way the proposed embodiments reduce the amount of computing and networking resources required to communicate curvature data. The curvature controller 121 may also associate either the maximum curvature value or average curvature value for the identified segment of the spline with the map data 201.

In another example, the curvature module 215 of the curvature controller 121 is configured to determine a maximum curvature value for the identified segment of the spline. In this example, when a plurality of sets of vehicle position data 203, or trace data, is received and stored by the memory 204 of the curvature controller 121, the curvature module 215 is configured to determine respective maximum curvature values for the identified respective segments of the respective splines and calculate an average curvature value of the respective maximum curvature values. The curvature module 215 of the curvature controller 121 may also be configured to associate the average curvature value with the map data 201.

After the ground truth curvature value is determined as described above, it is still desired to figure out an error tolerance range for the determined curvature value. The proposed embodiments aim to constitute the allowable error margin by considering self-fluctuation among all ground truth, i.e., how the curvature value fluctuates over all vehicle-collected trajectories. In one example, where the steps described above are repeated for a plurality of sets of position data 203, the curvature controller 121 calculates an error tolerance range for the average curvature value based on the received position data 203 for the plurality of sets of position data 203. Specifically, for a given curvature radius range, the proposed embodiments employ the average of standard deviation $\sigma$ over all radii falling in that range to form the error margin. By postulating a Gaussian distribution, the allowable error margin for that radius range may be designated as $\pm 3\sigma$ ("three-sigma"), which yields a confidence level under 99.7%. A curve fitting function may then be applied to the three-sigma error margin values to generate a fitted curve to the data, which is discussed in greater detail below with respect to FIG. 5. This curve, or equivalent mathematical function thereof, is then used to determine an error tolerance range for a given average curvature value. In this regard, the error tolerance range is based on actual real driving trajectories, as opposed to approximations based on image and positional data. An error tolerance range that is data driven and based on evidence helps define a more reliable KPI, among other things.

In this example, the curvature controller 121 may calculate an error tolerance range by first calculating a plurality of three-sigma error values for a plurality of radii, where a respective three-sigma error value represents an allowable relative error for a respective radius. In another example, the allowable error margin for a given radius range may be designated as a $\pm 2\sigma$ ("two-sigma"). The curvature controller 121 may then apply a least-square curve fitting function to the plurality of three-sigma error values to generate a least-square fitted curve. Next, the curvature controller 121 may determine the error tolerance range for the average curvature value based on the least-square fitted curve.

In another example, the curvature module 215 of the curvature controller 121 is configured to calculate an error tolerance range for the average curvature value based on the received position data 203 for the plurality of sets of position data 203. In this example, when a plurality of sets of vehicle position data 203, or trace data, is received and stored by the memory 204 of the curvature controller 121, the curvature module 215 is configured to calculate an error tolerance range for the average curvature value based on the plurality of sets of vehicle trace data. To calculate the error tolerance range, the curvature module 215 is configured to calculate a plurality of three-sigma error values for a plurality of radii, where a respective three-sigma error value represents an allowable relative error for a respective radius, apply a least-square curve fitting function to the plurality of three-sigma error values to generate a least-square fitted curve, and determine the error tolerance range for the average curvature value based on the least-square fitted curve.

Figure 5:
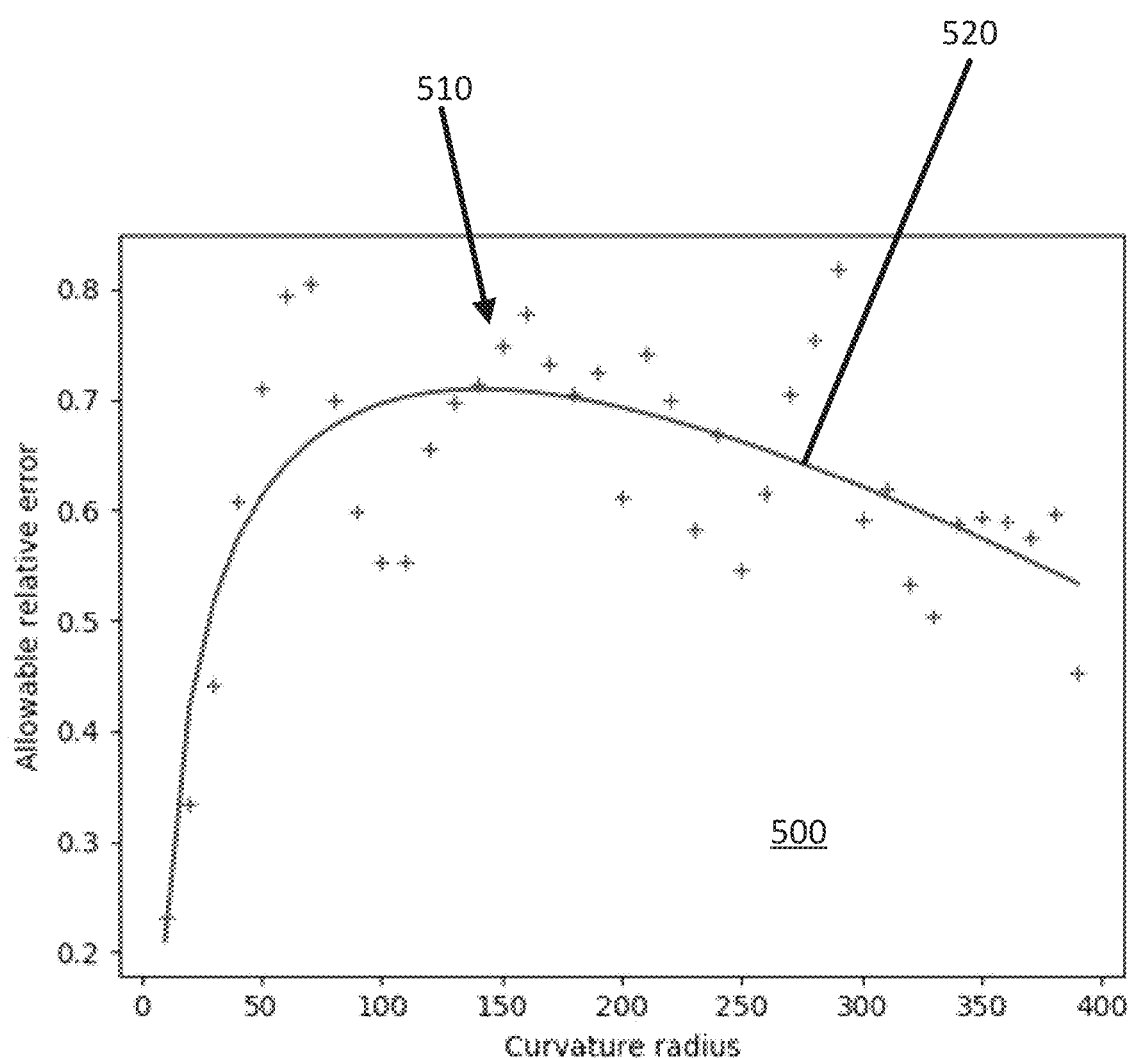
FIG. 5 illustrates a relationship between allowable relative error and curvature radius for one embodiment.

FIG. 5 illustrates a relationship 500 between allowable relative error and curvature radius for one embodiment. As shown in FIG. 5, a plurality of three-sigma error values 510 for a plurality of radii are plotted. As mentioned above, each respective three-sigma error value 510 represents an allowable relative error for particular radius, or range of radii. To promote the smoothness of sample values, a predetermined window of size may be utilized. For example, a window size of 40 meters may be utilized. Namely, for radius r, the allowable margin of error may be considered as the mean a whose average curvature radius falls within the range of (r−20, r+20). A least-square curve fitting function was applied to the plurality of three-sigma error values 510 to generate a least-square fitted curve 520. The least-square fitted curve 520 may be used to determine an error tolerance range for the average curvature value by using the radius associated with the average curvature value (i.e., the inverse of the curvature value).

In one example, to formulate the least-square fitted curve 520 mathematically, a regression on the data may be performed to yield a formula, such as a metric function of the form r(x)=a*log(b*x+c)+d*x+e may be used, where all parameters are to be fitted via the least-square criterion. In the above r(x) function, a, b, . . . , e are coefficients to be estimated under the least square rule, i.e., solve optimal values for these coefficients such that sum_i(d(x_i)−r(x_i))^2 is minimized, where x_i is the curvature radius and d(x_i) is corresponding 3-sigma error coming from the data. The least-square fitted curve 520 of FIG. 5 is a fitted curve under this model, and consequently by taking all boundary cases into account, the overall allowable error margin R(x) may be expressed as follows:

$$R(x) = \begin{cases} 0.25 & x < 10 \\ 0.22435 \times \log(169.46488x - 735.47772) - 0.00164x - 1.28426 & x \in [10, 400] \\ 0.5 & x > 400 \end{cases}$$

Since any 3-sigma data point is aggregated from multiple maneuvers with the same curvature radius, the derived formula essentially quantifies an averaged allowable error margin for all maneuvers under the same designated radius.

Referring back to FIG. 2, in one example, the curvature controller 121 may report the curvature data 231 (e.g., maximum curvature value or the average curvature value) to a map developer, an application developer, an end user, as well as any other services or providers, such as navigational services or traffic server providers, or any combination thereof. The maximum curvature value or the average curvature value may be reported in association with the position data 203 and map data 201. In another example, the communication interface 217 of the curvature controller 121 may be configured to report the curvature data 231 (e.g., average curvature value) to the same parties and services listed above. In yet another example, the curvature controller 121 (or the communication interface 217 of the curvature controller 121) may communicate the curvature data 231 to an external device 250.

The curvature controller 121 may also store the curvature data 231 (e.g., maximum curvature value or the average curvature value) in a map database or geographic database 123. The curvature data 231 may be stored in the map or geographic database 123 in association with the position data 203 and map data 201. The curvature controller 121 may also store the curvature data 231 in the map or geographic database 123 such that a maximum curvature value or average curvature value is queryable using a curvature value, a road segment identifier for a corresponding road segment, a node identifier for a corresponding node, or a combination thereof, as query parameters.

Figure 6:
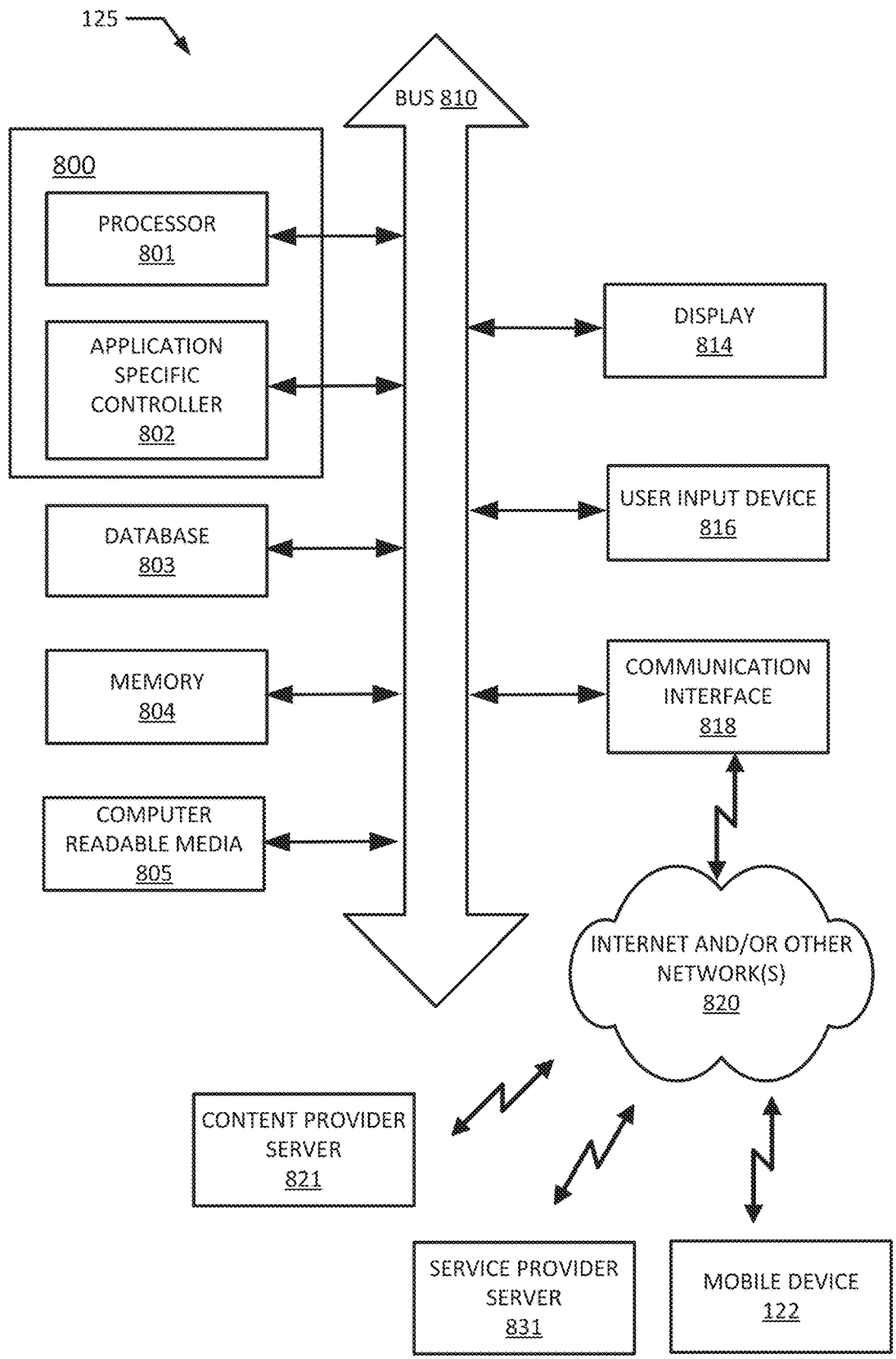
FIG. 6 illustrates an example server for the system of FIG. 1.

FIG. 6 illustrates an example server 125 for the system of FIG. 1. The server 125 may include a bus 810 that facilitates communication between a controller (e.g., the curvature controller 121) that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database 903 of the mobile device 122. Additional, different, or fewer components may be included.

The memory 804 and/or the computer readable medium 805 may include a set of instructions that can be executed to cause the server 125 to perform any one or more of the methods or computer-based functions disclosed herein. In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 820 with a content provider server 821 and/or a service provider server 831. The server 125 may provide the curvature data 231 to the content provider server 821 and/or the service provider server 831. The content provider may include device manufacturers that provide location-based services associated with different locations POIs that users may access.

Figure 7:
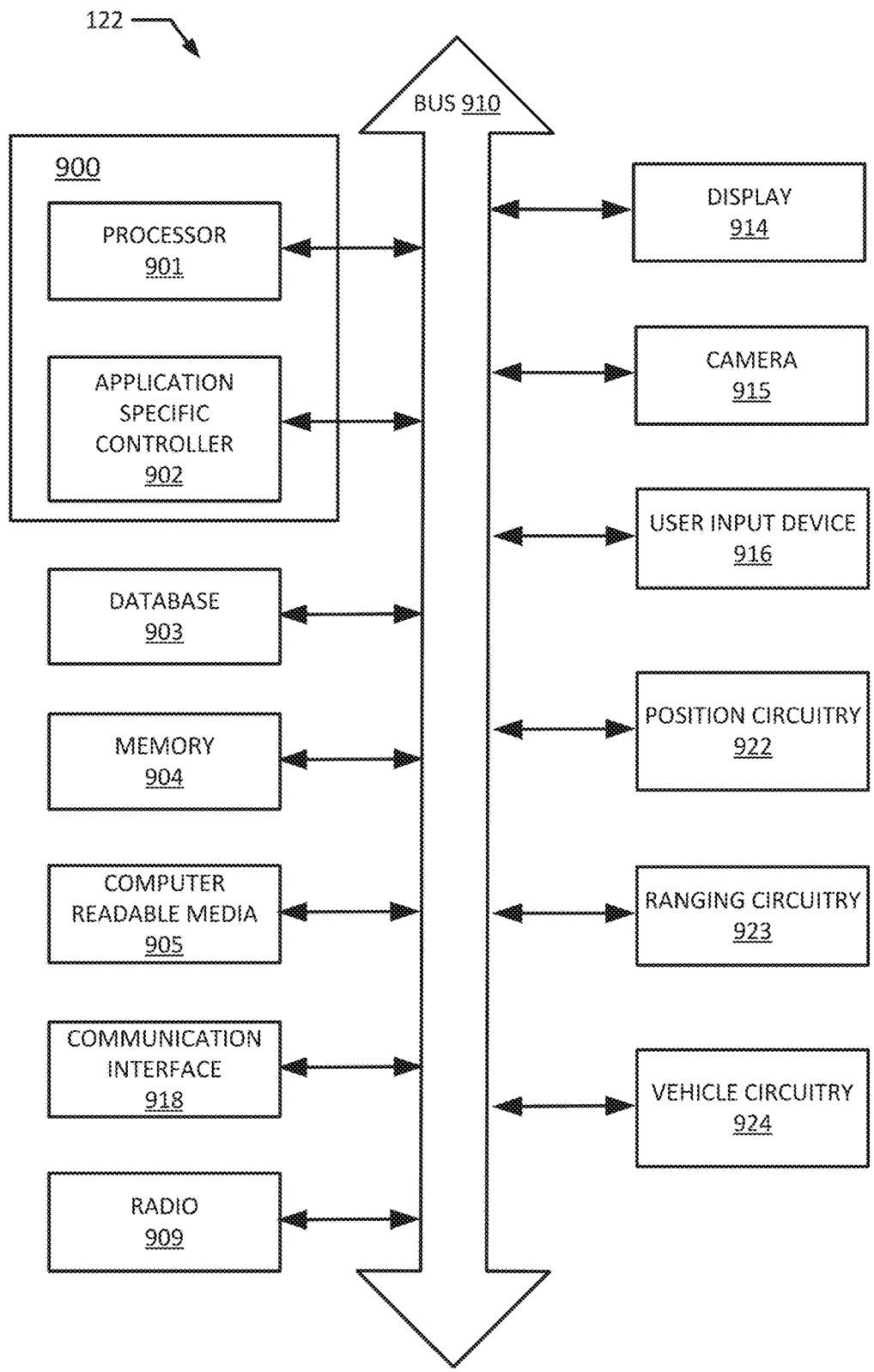
FIG. 7 illustrates an example mobile device for the system of FIG. 1.

FIG. 7 illustrates an example mobile device 122 for the system of FIG. 1. The mobile device 122 may include a bus 910 that facilitates communication between a controller (e.g., the curvature controller 121) that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the mobile device 122. The communication interface 918 connected to the internet and/or other networks (e.g., network 820 shown in FIG. 6). The vehicle circuitry 924 may include any of the circuitry and/or devices described with respect to FIG. 9. Additional, different, or fewer components may be included.

The radio 909 may be configured to radio frequency communication (e.g., generate, transit, and receive radio signals) for any of the wireless networks described herein including cellular networks, the family of protocols known as WiFi or IEEE 802.11, the family of protocols known as Bluetooth, or another protocol.

The memory 804 and/or memory 904 may be a volatile memory or a non-volatile memory. The memory 804 and/or memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The controller 900 may communicate with a vehicle ECU which operates one or more driving mechanisms (e.g., accelerator, brakes, steering device). Alternatively, the mobile device 122 may be the vehicle ECU, which operates the one or more driving mechanisms directly.

The controller 800 or 900 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 914 is an example means for displaying the routing command. The mobile device 122 may generate a routing instruction based on the anonymized data.

The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 8:
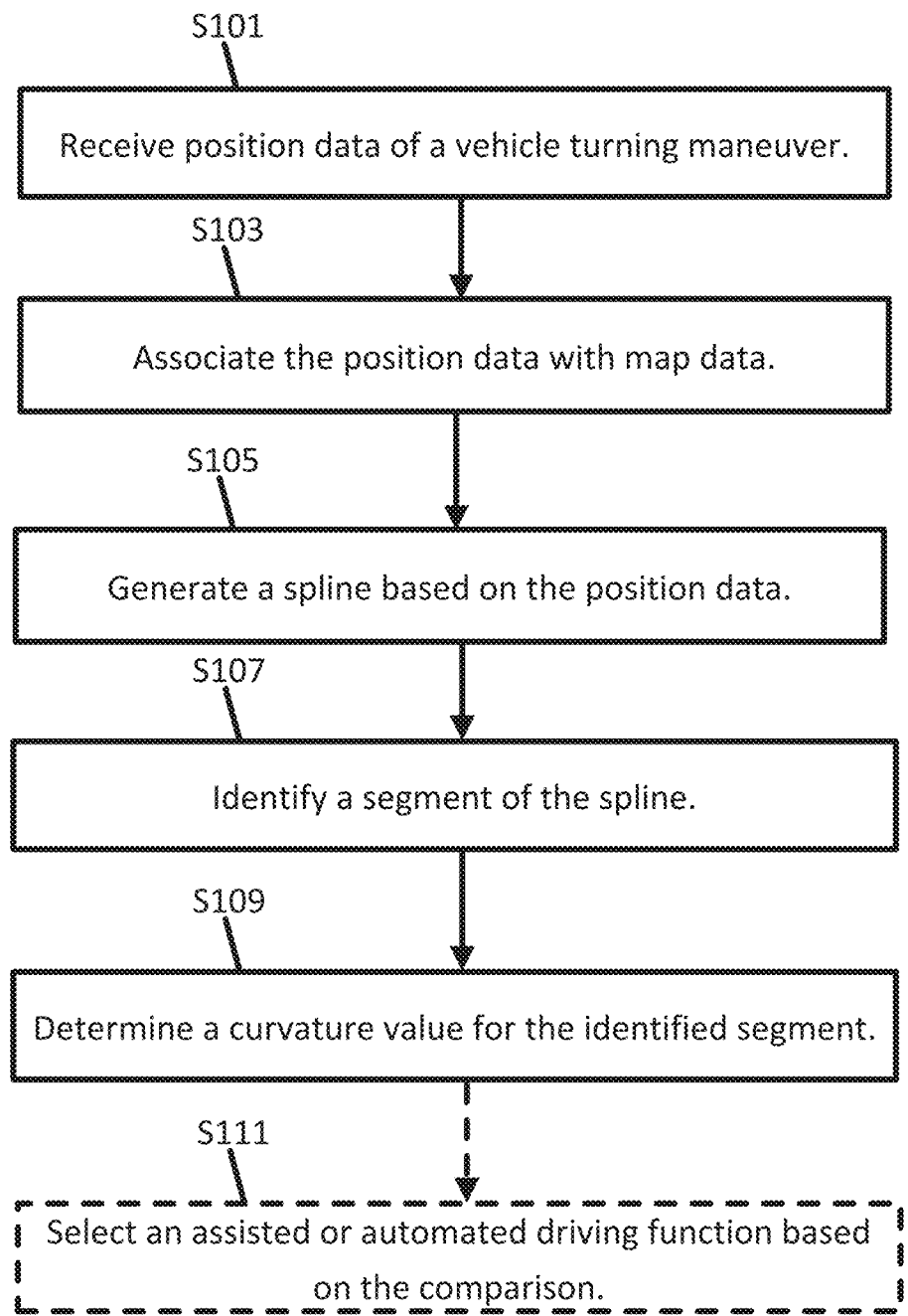
FIG. 8 illustrates an example flow chart for the mobile device of FIG. 7.

FIG. 8 illustrates an example flow chart for the mobile device of FIG. 7. Additional, different, or fewer acts may be included.

At act S101, the controller 900 receives position data 203 collected by sensors of a vehicle while traversing a turning maneuver from a first road segment to a second road segment along a portion of a roadway. The position data 203 may include position information, such as geographic coordinates (e.g., latitude and longitude). The sensors may include any of the circuitry and/or devices described with respect to FIG. 9. The sensors may also include OEM sensors.

At act S103, the controller 900 associates the received position data 203 with map data 201 of the portion of the roadway. The association may be performed by a map matching function, such as a path-based map matching operation. The map data 201 may include segment data and node data.

At act S105, the controller 900 generates a spline based on the position data 203. The spline may be a smooth curve representing the turning maneuver. The spline may be generated using a cubic spline fitting technique to generate a smooth curve. Any smooth curve fitting or any data analysis technique for estimating parameters in a spline polynomial, now known or later developed, may also be used.

At act S107, the controller 900 identifies a segment of the spline containing a curve with a smallest radius of curvature. The controller 900 may identify a common node or point of intersection between a first road segment and a second road segment in the map data, determine a projection point on the spline nearest the common node or point of intersection, and identify a predetermined range of the spline centered at the projection point as the segment of the spline.

At act S109, the controller 900 determines a maximum curvature value for the identified segment of the spline. The controller 900 may determine the smallest radius along the segment of the spline and calculate the maximum curvature value based on the smallest radius.

At act S111, the controller 900 selects an assisted or automated driving function based on the maximum curvature value. For example, the assisted driving function may utilize the maximum curvature value for speed warnings. The autonomous driving function may generate or provide driving commands to steer or otherwise control the vehicle based on the maximum curvature value. In one example, the driving command may engage a vehicle mechanical system to increase vehicle performance.

Figure 9:
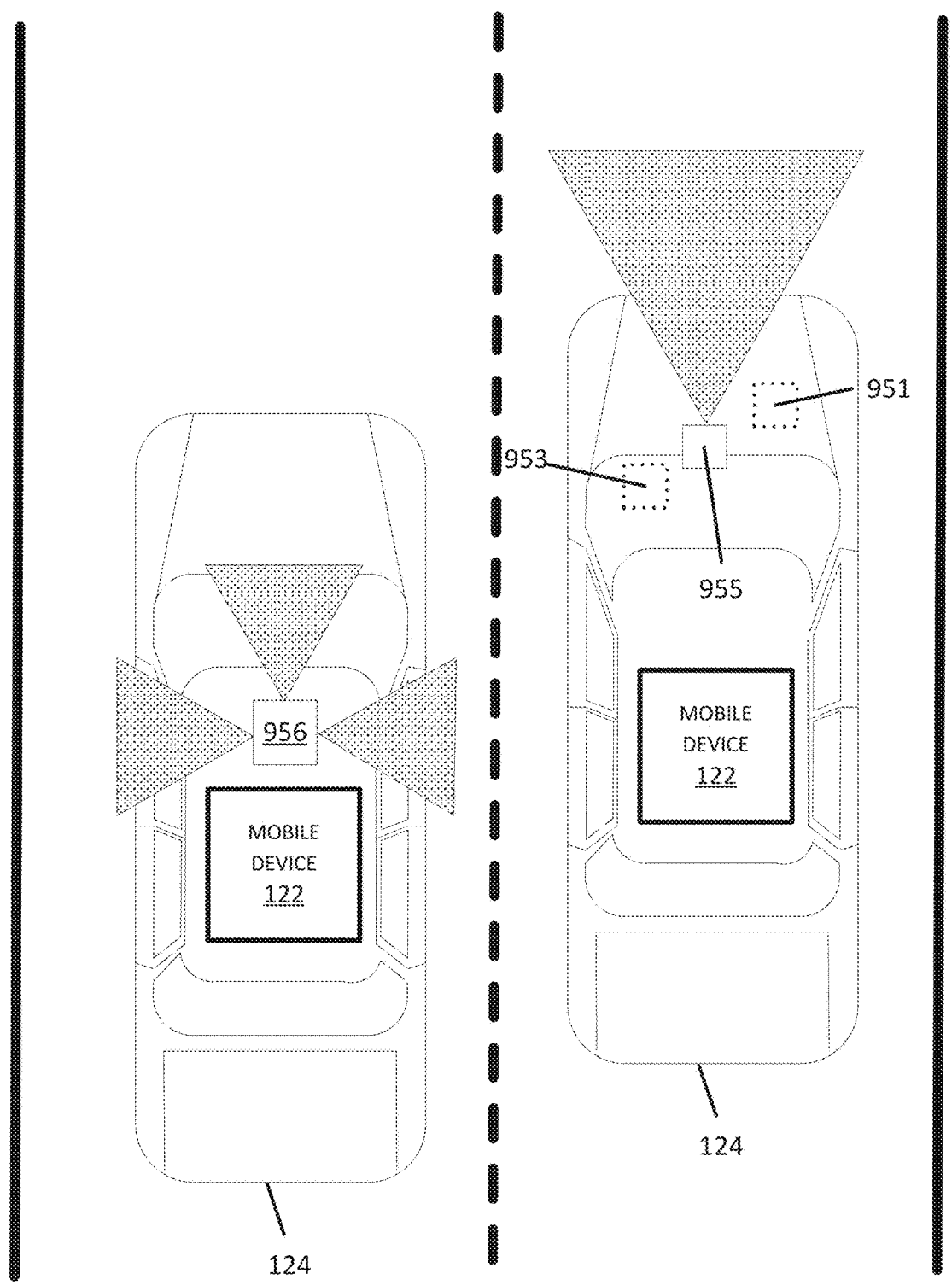
FIG. 9 illustrates exemplary vehicles for the system of FIG. 1.

FIG. 9 illustrates an exemplary vehicle 124 associated with the system of FIG. 1 for providing location-based services or application using the curvature data 231 described herein as well as collecting data for such services or applications and/or the generation of the curvature data 231 described herein. The vehicles 124 may include a variety of devices that collect position data 203 as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a LIDAR device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the curvature data 231 (maximum curvature value, average curvature data, radii data, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to curvature data 231 (maximum curvature value, average curvature data, radii data, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to curvature data 231 (maximum curvature value, average curvature data, radii data, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the curvature data 231 (maximum curvature value, average curvature data, radii data, or other characteristics) received from geographic database 123 and the server 125 and driving commands or navigation commands.

Figure 10:
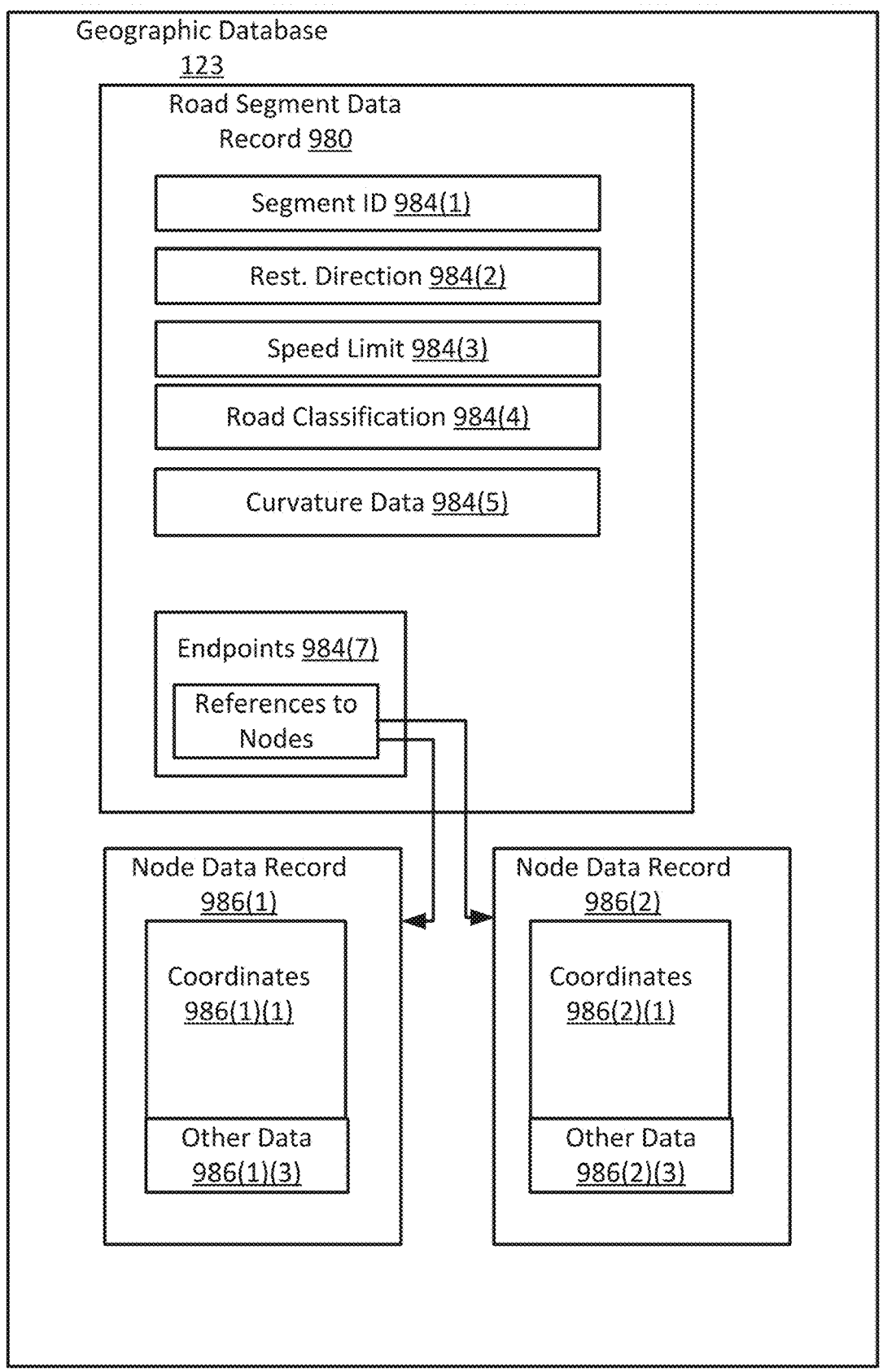
FIG. 10 illustrates an exemplary database.

FIG. 10 illustrates components of a road segment data record 980 contained in the geographic database 123 according to one embodiment. The geographic database 123 may contain at least one road segment database record 980 (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The road segment data record 980 may include a segment ID 984(1) by which the data record can be identified in the geographic database 123. Each road segment data record 980 may have associated with it information (such as "attributes", "fields", etc.) that describes features of the represented road segment. The road segment data record 980 may include data 984(2) that indicate the restrictions, if any, on the direction of vehicular travel permitted on the represented road segment. The road segment data record 980 may include data 984(3) that indicate a speed limit or speed category (i.e., the maximum permitted vehicular speed of travel) on the represented road segment. The road segment data record 980 may also include classification data 984(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 980 (or data entities) that describe curvature data 984(5) described herein. Additional schema may be used to describe road geometry, such as curves. The attribute data may be stored in relation to geographic coordinates (e.g., the latitude and longitude) of the end points of the represented road segment. In one embodiment, the data 984(7) are references to the node data records 986 that represent the nodes corresponding to the end points of the represented road segment.

The road segment data record 980 may also include or be associated with other data that refer to various other attributes of the represented road segment. The various attributes associated with a road segment may be included in a single road segment record or may be included in more than one type of record which cross-references to each other. For example, the road segment data record may include data identifying what turn restrictions exist at each of the nodes which correspond to intersections at the ends of the road portion represented by the road segment, the name, or names by which the represented road segment is identified, the street address ranges along the represented road segment, and so on.

The road segment data record 908 may also include endpoints 984(7) that reference one or more node data records 986(1) and 986(2) that may be contained in the geographic database 123. Each of the node data records 986 may have associated information (such as "attributes", "fields", etc.) that allows identification of the road segment(s) that connect to it and/or its geographic position (e.g., its latitude and longitude coordinates). The node data records 986(1) and 986(2) include the latitude and longitude coordinates 986(1)(1) and 986(2)(1) for their node, the node data records 986(1) and 986(2) may also include other data 986(1)(3) and 986(2)(3) that refer to various other attributes of the nodes. In one example, the node data records 986(1) and 986(2) include the latitude and longitude coordinates 986(1)(1) and 986(2)(1) and the other data 986(1)(3) and 986(2)(3) reference other data associated with the node.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, by a processor, position data of a vehicle turning maneuver along a portion of a roadway, wherein the position data comprises measured position data collected by sensors of a vehicle while traversing the vehicle turning maneuver;
   associating, by the processor, the received position data with map data of the portion of the roadway;
   generating, by the processor, a spline based on the position data, the spline being a smooth curve representing the vehicle turning maneuver from a first road segment to a second road segment;
   identifying a segment of the spline containing a turning point of the vehicle turning maneuver, the turning point representing a change of a vehicle path from along the first road segment to along the second road segment;
   determining a maximum curvature value for the identified segment of the spline; and
   selecting an assisted or automated driving function based on the maximum curvature value.

2. The method of claim 1, wherein identifying the segment of the spline comprises:
   identifying a common node or point of intersection between the first road segment and the second road segment in the map data;
   determining a projection point on the spline nearest the common node or point of intersection; and
   identifying a predetermined range of the spline centered at the projection point as the segment of the spline.

3. The method of claim 1, wherein the receiving, associating, generating, identifying, and determining are repeated for a plurality of sets of position data corresponding to the vehicle turning maneuver, wherein each set of position data of the plurality of sets of position data is separately collected by the vehicle or another vehicle while traversing the vehicle turning maneuver, the method further comprising:
   calculating an average curvature value of respective maximum curvature values for the plurality of sets of position data, wherein the average curvature value represents a ground truth curvature value.

4. The method of claim 3, further comprising:
   calculating an error tolerance range for the average curvature value based on the received position data for the plurality of sets of position data.

5. The method of claim 4, wherein calculating the error tolerance range comprises:
   calculating a plurality of three-sigma error values for a plurality of radii, wherein a respective three-sigma error value represents an allowable relative error for a respective radius;
   applying a least-square curve fitting function to the plurality of three-sigma error values to generate a least-square fitted curve; and
   determining the error tolerance range for the average curvature value based on the least-square fitted curve.

6. The method of claim 1, wherein the associating is performed by a path-based map matcher.

7. The method of claim 1, wherein the spline is generated using a cubic spline fitting technique.

8. The method of claim 1, further comprising:
   associating, by the processor, the maximum curvature value for the identified segment of the spline with the map data.

9. The method of claim 1, further comprising:
   reporting the maximum curvature value to a map developer.

10. The method of claim 1, further comprising:
    storing the maximum curvature value in a map database or geographic database.

11. The method of claim 10, wherein storing the maximum curvature value in the map database or geographic database further comprises:
    storing the maximum curvature value such that maximum curvature value is queryable using a curvature value, a road segment identifier for a corresponding road segment, a node identifier for a corresponding node, or a combination thereof, as query parameters.

12. An apparatus comprising:
    a memory including a plurality of sets of vehicle trace data, wherein each set of vehicle trace data is separately collected by one or more vehicles while traversing a turning maneuver from a first road segment to a second road segment along a portion of a roadway;
    a map matching module configured to associate the plurality of sets of vehicle trace data with map data of the portion of the roadway;
    a splining module configured to generate respective splines for respective sets of vehicle trace data using a cubic spline fitting technique and identify respective segments of the respective splines containing a curve with a smallest radius of curvature;
    a curvature module configured to determine respective maximum curvature values for the identified respective segments of the respective splines and calculate an average curvature value of the respective maximum curvature values; and
    a controller configured to select an assisted or automated driving function based on the maximum curvature value.

13. The apparatus of claim 12, wherein the splining module is further configured to identify a common node or point of intersection between the first road segment and the second road segment in the map data, determine a projection point on the respective splines nearest the common node or point of intersection, and identify a predetermined range of the respective splines centered at the projection point as the respective segments of the respective splines.

14. The apparatus of claim 12, wherein the curvature module is further configured to associate the average curvature value with the map data.

15. The apparatus of claim 12, wherein the curvature module is further configured to calculate an error tolerance range for the average curvature value based on the plurality of sets of vehicle trace data.

16. The apparatus of claim 15, wherein the calculation of the error tolerance range comprises:
    calculation of a plurality of three-sigma error values for a plurality of radii, wherein a respective three-sigma error value represents an allowable relative error for a respective radius;
    application of a least-square curve fitting function to the plurality of three-sigma error values to generate a least-square fitted curve; and
    determination of the error tolerance range for the average curvature value based on the least-square fitted curve.

17. The apparatus of claim 12, further comprising:
    a communication interface configured to report the average curvature value to a map developer.

18. A non-transitory computer readable medium including instructions that when executed are configured to perform:
- receiving position data collected by sensors of a vehicle while traversing a turning maneuver from a first road segment to a second road segment along a portion of a roadway;
- associating the received position data with map data of the portion of the roadway;
- generating a spline based on the position data, the spline being a smooth curve representing the turning maneuver;
- identifying a segment of the spline containing a curve with a smallest radius of curvature;
- determining a maximum curvature value for the identified segment of the spline; and
- selecting an assisted or automated driving function based on the maximum curvature value.

19. The non-transitory computer readable medium of claim 18, wherein the assisted or automated driving function generates a driving command based on the maximum curvature value.

20. The non-transitory computer readable medium of claim 19, wherein the driving command engages a vehicle mechanical system to increase vehicle performance.

* * * * *